United States Patent [19]

Smith et al.

[11] Patent Number: 5,434,010
[45] Date of Patent: Jul. 18, 1995

[54] HEAT SHRINKABLE VERY LOW DENSITY POLYETHYLENE TERPOLYMER FILM

[75] Inventors: Edwin R. Smith, Chicago; Jeffrey M. Schuetz, Woodridge; Stanley Lustig, Park Forest, all of Ill.

[73] Assignee: Viskase Corporation, Chicago, Ill.

[21] Appl. No.: 60,785

[22] Filed: May 12, 1993

Related U.S. Application Data

[60] Division of Ser. No. 892,637, Jun. 2, 1992, abandoned, which is a continuation of Ser. No. 286,019, Dec. 19, 1988, abandoned.

[51] Int. Cl.$^6$ .................................................. B32B 27/08
[52] U.S. Cl. ..................................... 428/520; 428/500; 428/516; 428/518; 428/349; 428/910
[58] Field of Search ................. 428/516, 520, 34.9, 428/500, 518, 910

[56] References Cited

U.S. PATENT DOCUMENTS

| | | | |
|---|---|---|---|
| 3,456,044 | 7/1969 | Pahlke | 264/25 |
| 3,549,389 | 12/1970 | Peterson | 99/174 |
| 3,555,604 | 1/1971 | Pahlke | 18/14 |
| 3,579,416 | 5/1971 | Schrenk | 161/254 |
| 3,645,992 | 2/1972 | Elston | 260/80.78 |
| 3,900,635 | 8/1975 | Funderburk, Jr. et al. | 428/213 |
| 4,044,187 | 8/1977 | Kremkau | 428/212 |
| 4,182,457 | 1/1980 | Yamada et al. | 215/1 C |
| 4,188,350 | 2/1980 | Vicik et al. | 525/232 |
| 4,198,256 | 4/1980 | Andrews et al. | 156/229 |
| 4,254,169 | 3/1981 | Schroeder | 428/35 |
| 4,256,784 | 3/1981 | Gebhardt et al. | 428/216 |
| 4,359,561 | 11/1982 | Fraser et al. | 526/88 |
| 4,380,567 | 4/1983 | Shigemoto | 428/213 |
| 4,384,024 | 5/1983 | Mitchell et al. | 428/349 |
| 4,424,243 | 1/1984 | Nishimoto et al. | 428/36 |
| 4,429,079 | 1/1984 | Shibata et al. | 525/240 |
| 4,438,243 | 3/1984 | Kashiwa et al. | 526/125 |
| 4,447,480 | 5/1984 | Lustig et al. | 428/35 |
| 4,457,960 | 7/1984 | Newsome | 428/35 |
| 4,508,842 | 4/1985 | Beran et al. | 502/112 |
| 4,547,413 | 10/1985 | Lustig et al. | 428/35 |
| 4,558,105 | 12/1985 | Carrick et al. | 526/68 |
| 4,623,581 | 11/1986 | Hert | 428/220 |
| 4,640,856 | 2/1987 | Ferguson et al. | 428/36 |
| 4,668,752 | 5/1987 | Tominari et al. | 526/348.2 |
| 4,690,991 | 9/1987 | Seppala | 526/158 |

(List continued on next page.)

FOREIGN PATENT DOCUMENTS

| | | |
|---|---|---|
| 437017 | 10/1969 | Australia . |
| 82139 | 4/1982 | Australia . |
| 81139 | 8/1983 | Australia . |
| 63102 | 8/1987 | Australia . |
| 0120503 | 10/1984 | European Pat. Off. . |
| 0144716 | 6/1985 | European Pat. Off. . |
| 0168928 | 1/1986 | European Pat. Off. . |
| 0172650 | 2/1986 | European Pat. Off. . |
| 0184094 | 6/1986 | European Pat. Off. . |
| 0217252 | 4/1987 | European Pat. Off. . |
| 0247897 | 12/1987 | European Pat. Off. . |

(List continued on next page.)

OTHER PUBLICATIONS

U.S. patent application Ser. No. 07/614,819 filed Nov. 16, 1990, Mueller.

Utracki et al., "Linear Low Density Polyethylene and Their Blends: Part 4 Shear Flow of LLDPE Blends with LLDPE and LDPE", *Polymer Engineering and Science*, vol. 27, No. 20, pp. 1512–1522 (mid–Nov., 1987).

Dohrer et al., "Short Chain Branching of ULDPE", *Journal of Plastic Film & Sheeting*, vol. 4, pp. 217–226 (Jul., 1988).

(List continued on next page.)

*Primary Examiner*—Edith Buffalow
*Attorney, Agent, or Firm*—Cedric M. Richeson

[57] ABSTRACT

Biaxially stretched, heat shrinkable monolayer and multilayer films comprising very low density polyethylene terpolymers of monomers (a), (b) and (c), where (a) comprises ethylene, (b) comprises a $C_6$–$C_8$ alpha-olefin and (c) comprises 1-butene or 1-hexene, have a very good combination of physical properties and processability including high shrinkage values and puncture resistance.

26 Claims, No Drawings

U.S. PATENT DOCUMENTS

| | | | |
|---|---|---|---|
| 4,737,547 | 4/1988 | White | 525/193 |
| 4,801,486 | 1/1989 | Quacquarella et al. | 428/34.9 |
| 4,814,135 | 3/1989 | Heitz | 264/564 |
| 4,820,557 | 4/1989 | Warren | 428/34.9 |
| 4,826,939 | 5/1989 | Stuart, Jr. | 526/348.5 |
| 4,833,017 | 5/1989 | Benoit | 428/323 |
| 4,835,194 | 5/1989 | Bright | 523/169 |
| 4,842,922 | 6/1989 | Krupp et al. | 428/198 |
| 4,857,611 | 8/1989 | Durand et al. | 526/88 |
| 4,863,769 | 9/1989 | Lustig et al. | 428/34.9 |
| 4,897,274 | 1/1990 | Candida et al. | 426/127 |
| 4,994,324 | 2/1991 | Bose et al. | 428/349 |
| 5,032,463 | 7/1991 | Smith | 428/520 |

FOREIGN PATENT DOCUMENTS

| | | |
|---|---|---|
| 0255622 | 2/1988 | European Pat. Off. . |
| 0260038 | 3/1988 | European Pat. Off. . |
| 0265544 | 5/1988 | European Pat. Off. . |
| 0282282 | 9/1988 | European Pat. Off. . |
| 0341091 | 11/1989 | European Pat. Off. . |
| 30507 | 2/1986 | Japan . |
| 69807 | 4/1986 | Japan . |
| 45306 | 2/1988 | Japan . |
| 32248 | 2/1989 | Japan . |
| 1295656 | 10/1972 | United Kingdom . |
| 2019412B | 10/1979 | United Kingdom . |
| 1557920 | 12/1979 | United Kingdom . |
| 2034723A | 6/1980 | United Kingdom . |
| 2097324A | 11/1982 | United Kingdom . |
| 2125417A | 3/1984 | United Kingdom . |
| 2125417 | 7/1984 | United Kingdom . |

OTHER PUBLICATIONS

"Effect of Comonomer Additions on the Properties of Linear Low–Density Polyethylene (LLDPE) Resin", C. Lee, I. Peat, L. Wild and P. Fernando, ANTEC '88, pp. 591–594 (Altanta, Apr.).

"Correlation Between Orientation and Tear Strengths on Blown Linear Low–Density Polyethylene (LLDPE) Films", C. Lee, I. Peat, L. Wild and P. Fernando, ANTEC '88, pp. 183–186.

Lee et al., "Terpolymers Boost Film Strength Properties", *Plastic Engineering*, vol. XLIV, No. 12, pp. 43–46 (Dec., 1988).

"Cast Film", 12 page document from DSM, undated but allegedly published prior to Dec. 19, 1988.

"Stamylex Film Grades", 10 page document from DSM Polymers International, undated but allegedly published prior to Dec. 19, 1988.

"Can 'VLDPE' Outperform EVA, Other Copolymers?", *Modern Plastics*, pp. 12 & 14, (Oct., 1984).

"Tafmer ©. . . A New–Type Elastomer As Plastics Modifying Agent, Supplied In Pellet Form", 7 page document from Mitsui Petrochemical Industries, Ltd. (Aug., 1975).

Dowlex ULDPE Polymers, Jan. 1987 brochure, 20 pages (Dow Chemical Company).

*Federal Register* p. 23798 (Jun. 24, 1988).

21 *CFR* 177.1520.

ASTM Standard Test Methods: D–1505; D–1238, Cond. E, F; D–3593; D–3518; D–2103; D–882; D–2457; D–1003 and D–1525.

HEAT SHRINKABLE VERY LOW DENSITY POLYETHYLENE TERPOLYMER FILM

This application is a division of prior U.S. application Ser. No. 07/892,637 Filing Date Jun. 2, 1992 which is a continuation of application Ser. No. 07/286,019 Filing Date Dec. 19, 1988 which applications are hereby incorporated by reference in their entireties both now abandoned.

BACKGROUND OF THE INVENTION

The present invention relates to packaging films. In particular, the present invention relates to biaxially stretched, heat shrinkable films made of copolymers of polyethylene.

Polyethylene is the name for a polymer whose basic structure is characterized by the chain $+CH_2CH_2+_n$. Polyethylene homopolymer is generally described as being a solid which has a partially amorphous phase and partially crystalline phase with a density of between 0.915 to 0.970 g/cm$^3$. The relative crystallinity of polyethylene is known to affect its physical properties. The amorphous phase imparts flexibility and high impact strength while the crystalline phase imparts a high softening temperature and rigidity.

Unsubstituted polyethylene is generally referred to as high density homopolymer and has a crystallinity of 70 to 90 percent with a density between about 0.96 to 0.97 g/cm$^3$. Most commercially utilized polyethylenes are not unsubstituted homopolymer but instead have $C_2$-$C_8$ alkyl groups attached to the basic chain. These substituted polyethylenes are also known as branched chain polyethylenes. Also, commercially available polyethylenes frequently include other substituent groups produced by copolymerization. Branching with alkyl groups generally reduces crystallinity, density and melting point. The density of polyethylene is recognized as being closely connected to the crystallinity. The physical properties of commercially available polyethylenes are also affected by average molecular weight and molecular weight distribution, branching length and type of substituents.

People skilled in the art generally refer to several broad categories of polymers and copolymers as "polyethylene." Placement of a particular polymer into one of these categories of "polyethylene" is frequently based upon the density of the "polyethylene" and often by additional reference to the process by which it was made since the process often determines the degree of branching, crystallinity and density. In general, the nomenclature used is nonspecific to a compound but refers instead to a range of compositions. This range often includes both homopolymers and copolymers.

For example, "high density" polyethylene (HDPE) is ordinarily used in the art to refer to both (a) homopolymers of densities between about 0.960 to 0.970 g/cm$^3$ and (b) copolymers of ethylene and an alpha-olefin (usually 1-butene or 1-hexene) which have densities between 0.940 and 0.958 g/cm$^3$. HDPE includes polymers made with Ziegler or Phillips type catalysts and is also said to include high molecular weight "polyethylenes." In contrast to HDPE, whose polymer chain has some branching, are "ultra high molecular weight polyethylenes" which are essentially unbranched specialty polymers having a much higher molecular weight than the high molecular weight HDPE.

Hereinafter, the term "polyethylene" will be used (unless indicated otherwise) to refer to ethylene homopolymers as well as copolymers of ethylene with alpha-olefins and the term will be used without regard to the presence or absence of substituent branch groups.

Another broad grouping of polyethylene is "high pressure, low density polyethylene" (LDPE). The polyethylene industry began in the 1930's as a result of the discovery of a commercial process for producing LDPE by Imperial Chemical Industries, Ltd. researchers. LDPE is used to denominate branched homopolymers having densities between 0.915 and 0.930 g/cm$^3$ as well as copolymers containing polar groups resulting from copolymerization e.g. with vinyl acetate or ethyl acrylate. LDPEs typically contain long branches off the main chain (often termed "backbone") with alkyl substituents of 2 to 8 carbon atoms.

In the 1970's a new grouping of polyethylene was commercialized—Linear Low Density Polyethylene (LLDPE). Only copolymers of ethylene with alpha-olefins are in this group, LLDPEs are presently recognized by those skilled in the art as having densities from 0.915 to .940 g/cm$^3$. The alpha-olefin utilized is usually 1-butene, 1-hexene, or 1-octene and Ziegler-type catalysts are usually employed (although Phillips catalysts are also used to produce LLDPE having densities at the higher end of the range).

In the 1980's yet another grouping of polyethylene has come into prominence—Very Low Density Polyethylene (VLDPE) which is also called "Ultra Low Density Polyethylene" (ULDPE). This grouping like LLDPEs comprise only copolymers of ethylene with alpha-olefins, usually 1-butene, 1-hexene or 1-octene and are recognized by those skilled in the art as having a high degree of linearity of structure with short branching rather than the long side branches characteristic of LDPE. However, VLDPEs have lower densities than LLDPEs. The densities of VLDPEs are recognized by those skilled in the art to range between 0.860 and 0.915 g/cm$^3$. A process for making VLDPEs is described in European Patent Document publication number 120,503 whose text and drawing are hereby incorporated by reference into the present document.

Various types of polyethylene resins have long been used to produce films having different properties. These polyethylenes have been used alone, in blends and with copolymers in both monolayer and multilayer films for packaging applications for such food products as poultry, fresh red meat and processed meat. In the food industry greater use of centralized processing of foods in conjunction with increased handling and long distance transportation have increased the demand for packaging films having superior properties.

In the poultry and meat segments of the food industry thermoplastic heat shrinkable flexible films are utilized to maintain freshness. Meat is frequently sold fresh, frozen or cooked; therefore films advantageously provide protection at various temperatures. Food items such as primal and subprimal cuts of beef, ground beef and processed meats are known to use coextruded, extrusion coated or laminated films which utilize such compositions as LLDPE, nylon, polyester, copolymer of vinylidene chloride (PVDC), ethylene-vinyl acetate copolymer (EVA) and ionomers.

It is generally known that selection of films for packaging food products includes consideration of one or more criteria such as puncture resistance, shrinkability, shrink force, cost, sealability, stiffness, strength, printability, durability, barrier properties, machinability, optical properties such as haze and gloss, flex-crack resistance and government approval for contact with food.

For example, several film materials containing polyethylene have been either used or proposed for packaging frozen poultry. In general, commercial poultry packaging operations require bags made from materials able to withstand the following typical process and transfer steps:

1. Inserting a bird into a bag fabricated from a shrinkable film;
2. Evacuating the bag;
3. Clamping or otherwise sealing the neck of the bag;
4. Transporting the bird (e.g. by a conveyor belt) to a shrink tunnel;
5. Shrinking the bag tightly around the bird by exposing the bag to a temperature of about 90°–95° C. for up to about six to eight seconds;
6. Quick freezing and storage of the packaged bird at temperatures as low as −40° C.; and
7. Transporting the packaged bird from the commercial packer to the ultimate user.

A film useful for frozen poultry packaging will include among its desirable properties the following:

a) A shrinkage value that yields a reduction in the area of the film at a temperature from 90°–95° C. that is sufficient to conform the film to the irregular shape of the bird;
b) a shrink force at a temperature of 90°–95° C. is required that is sufficient to pull the wings of the bird in tightly toward the body with sufficient residual shrink force to maintain a tight wrap around the bird; and
c) a puncture resistance sufficient to withstand the packaging operation itself as well as subsequent transport of the packaged bird.

All the above properties should be provided in a film at a minimum of cost.

Several polyolefin films have previously been proposed for use as poultry bags.

U.S. Pat. No. 3,555,604 (Pahlke) discloses that low density polyethylene may be biaxially oriented to produce a film which is useful for packaging foodstuffs such as turkey.

Multilayer biaxially oriented films have been proposed for poultry bags such as those described in U.S. Pat. No. 3,900,635 (Funderburk, Jr. et al) wherein a first layer comprises an ethylene homopolymer or copolymer and a second layer comprises a blend of an ionomer and a second ethylene homopolymer or copolymer.

Also, various blends of different polyethylene resins have been reported. For example, blends of LLDPE with LLDPE or LDPE have been reported in the article by Utracki et al, "Linear Low Density Polyethylene and Their Blends: Part 4 Shear Flow of LLDPE Blends with LLDPE and LDPE", *Polymer Engineering and Science*, Vol. 27, No. 20, pp 1512–1522 (mid-November, 1987). In its introduction, the above article states that . . . "at least 60% of LLDPE is sold in blends with polyolefins or EVA (ethylene-vinyl acetate copolymers) (cite omitted). Amelioration of properties (e.g., puncture resistance), lowering of material cost or improvement of processability are the main reasons". The article goes on to discuss data relating to blends of a LLDPE made from a copolymer of polyethylene with 1-butene with (a) a LLDPE made from a copolymer of polyethylene and 1-hexene, and (b) a LDPE.

Various VLDPEs have been suggested for use as suitable resins for making a shrinkable multilayer or single layer film for food packaging.

U.S. Pat. No. 4,640,856 (Ferguson et al) discloses heat shrinkable multilayer films containing VLDPE which are useful in packaging meat, poultry and dairy products. Ferguson, et al in describing their thermoplastic polymeric layer also state that "in certain applications blends of VLDPE, LLDPE and/or EVA may be used to achieve desired properties".

Other patents have disclosed use of VLDPE resins in film including U.S. Pat. Nos. 4,671,987; 4,720,427; and 4,726,997.

Various ethylene based terpolymer resins having densities below 0.915 have been previously described. For example, EP Patent Application Publication No. 144 716 (Carrick et al) discloses a process where "ethylene is copolymerized with one or more comonomers which comprise 1-olefins having between 3 and 8 carbon atoms in their main carbon chains. The 1-olefin comonomers may be substituted or unsubstituted. Olefins such as propylene, 1-butene, 1-hexene, 1-octene and substituted comonomers such as 4-methyl-1-pentene-1 are preferred". Copolymers are said to be formed having "densities generally in the range of less than about 0.87 g/cc to about 0.94 g/cc." Although broadly suggesting a process for copolymerizing ethylene with one or more monomers, Carrick et al does not have any specific examples of copolymers made with more than two monomer components. Also, Carrick et al is silent regarding any utility of the materials disclosed therein for making heat shrinkable films, for example, for packaging.

The concept of using copolymer resins having more than two monomers to form heat sealable films has been broadly disclosed, for example, in European Patent Application Publication number 247,897 (Bossaert et al). Bossaert et al disclose films which are preferably based on propylene which are heat shrinkable, and may be biaxially oriented. These films are described as being useful for packaging. Bossaert et al are silent regarding any puncture or shrinkage properties of their film and do not have any specific examples of copolymers made with more than two monomer components.

Heat shrinkable films comprising propylene-ethylene-alpha-olefin terpolymer are also known as shown by Japanese Patent Application Publication Number 45306/1988 (Isaka et al). Isaka et al disclose a propylene-ethylene-alpha-olefin terpolymer heat-shrinkable film. This terpolymer film is described as containing less than ten weight percent ethylene.

Also, various government regulatory approvals for various terpolymers for use in contact with food have been or are being sought for such terpolymers as ethylene-octene-butene terpolymer, ethylene-octene-hexene terpolymer (See e.g. Fed. Reg. 23798 Jun. 24, 1988) or ethylene-hexene-butene terpolymer (See 21 CFR 177.1520).

None of the foregoing publications have disclosed biaxially stretched, heat shrinkable films made from a very low density polyethylene terpolymer of ethylene, 1-butene, and a $C_6$–$C_8$ alpha-olefin, or ethylene, 1-hexene and either a $C_6$–$C_8$ alpha olefin. Also, presently known films used as poultry bags continue to suffer from insufficient puncture resistance, and/or shrinkability.

Puncture resistance is a useful property of packaging films in general and an important property of food packaging films. Puncture resistance is very important for films used in forming bags for poultry. These poultry bags must have a high puncture resistance in order to withstand packaging operations and transport as well as retail customer inspection and handling. Punctured poultry bags not only expose the contained birds to spoilage agents, but also allows leakage of liquid from within the bag. This leakage is highly undesirable to grocery shoppers and retailers. In retail poultry displays, leaked liquid often is transferred to adjacent products making displays and selection messy. A shopper who places a punctured bag into a grocery cart may cause moisture damage to paper products or packaging. In addition, concern about possible salmonella or other bacterial contamination via contact with leaked poultry liquid increases the desirability of puncture resistant poultry packaging.

Punctured and leaking bags are still very much a problem in poultry packaging. Recently, very low density polyethylene (VLDPE) resins have been utilized in making shrinkable packaging films including films for food contact packaging.

One type of commercially available VLDPE is a copolymer of ethylene and 1-butene sold by Union Carbide Corporation under the brand designation DFDA 1137, Natural 7. Disadvantageously, this resin has been found to have low puncture resistance in packaging operations. In particular, where packaging films are exposed to elevated temperatures in a film shrinking step of a packaging operation, puncture resistance is undesirably low.

Another type commercially available VLDPE is a copolymer of ethylene and 1-octene sold by Dow Chemical Company under the brand designation Attane 4001. While this film has improved puncture properties relative to DFDA 1137, it has undesirably low shrinkage values.

An experimental VLDPE that is a copolymer of ethylene and 1-hexene was obtained from Union Carbide Corporation under the experimental brand designation DEFD 1569. In one experiment disclosed in the present application, heat shrinkable, biaxially oriented films were made under similar conditions. A film made from this experimental ethylene, 1-hexene VLDPE when compared to a film made from DFDA 1137, had a similar dynamic puncture resistance, greater hot water puncture resistance and undesirably low shrinkage values.

Advantageously, a biaxially stretched, heat shrinkable film of the present invention may have both high dynamic puncture resistance relative to similarly formed films made from commercially available 1-butene based VLDPE resins and experimental 1-hexene based VLDPE resins as well as high shrinkage values relative to similarly formed films made from commercially available 1-octene based VLDPE resins and experimental 1-hexene based VLDPE resins. An inventive film has also been found to have a high puncture resistance at elevated temperatures (hot water puncture resistance) relative to a similarly formed 1-butene based VLDPE film.

Although the broad concept of making ethylene-alpha olefin terpolymer resins has been previously disclosed in the art, heat shrinkable, biaxially stretched films of the specific terpolymers according to the present invention have not been taught in the prior art. Previously, where specific terpolymers have been disclosed in any detail, most often propylene and/or a diene has been one of the terpolymer comonomers. These known terpolymer resins are generally synthetic elastomers having properties similar to rubber, which makes these materials generally undesirable for use as the principal component of the packaging film. These elastomeric resins typically have very low crystallinity to the point of being amorphous with no definite crystalline melting point unlike the resins utilized in the present invention. Moreover, the utility and properties of biaxially stretched, heat shrinkable, flexible films comprising the specific ethylene, $C_6$–$C_8$ alpha-olefin, and 1-butene or 1-hexene terpolymers according to the present invention have not been previously disclosed. These previously unknown, useful and surprising properties of these novel films are now disclosed below for the first time in the present specification.

SUMMARY OF THE INVENTION

According to the present invention a novel biaxially stretched, heat shrinkable film comprising a terpolymer of monomers (a), (b) and (c), wherein monomer (a) comprises ethylene, monomer (b) comprises a $C_6$–$C_8$ alpha-olefin such as 4-methyl-1-pentene, 1-hexene or 1-octene and monomer (c) comprises 1-butene or 1-hexene, having a terpolymer density less than 0.915 g/cm$^3$ is provided. Advantageously, certain properties and combinations of properties of the biaxially stretched film of the invention are superior to films made of copolymers of ethylene and the other terpolymer monomer components alone e.g. either 1-butene or 1-hexene or the $C_6$–$C_8$ alpha-olefin utilized. In particular, the inventive heat shrinkable terpolymer films exhibit a desirable combination of high shrinkage values and high dynamic and hot water puncture resistance which are advantageous for producing packaging bags e.g. for poultry, fresh red meat and processed foods such as processed meat and cheese.

DETAILED DESCRIPTION OF THE INVENTION

Very Low Density Polyethylenes (VLDPEs) are copolymers of ethylene and one or more alpha-olefins (such as propylene, 1-butene, 1-hexene or 1-octene) which have densities between 0.915 and 0.860 g/cm$^3$. The terpolymers of the present invention are VLDPEs which may be made by solution processes or fluidized bed processes. European Patent Application 84 103441.6 having publication number 120503 (which is hereby incorporated by reference in its entirety into the present application insofar as its teachings are consistent with the present disclosure) describes a suitable method for preparation of low density, low modulus ethylene copolymers utilizing a fluidized bed. These ethylene copolymers are described as having a density of less than 0.915 g/cm$^3$ and a 1% secant modulus of less than 140,000 kPa and this process and resulting terpolymer resins which may be made by this process are believed to be suitable for the films of the present invention. The well known fluidized bed process such as the Unipol (Trademark of Union Carbide Corporation) process and reactor may without undue experimentation be adapted to produce suitable terpolymers of the present invention.

Catalyst selection is recognized by those of ordinary skill in the art to be an important variable parameter for modifying terpolymer polymerization and resultant properties. Various catalysts are known in the art as useful for modifying VLDPE polymer formulation.

Examples of various catalysts known to be useful in making very low density polyethylene, include titanium, magnesium or vanadium containing compositions which are known in the art of polyethylene resin manufacture. Suitable catalysts include those disclosed in European Patent Publication No. 120,503 and U.S. Pat. No. 4,508,842. It is believed that catalyst selection as well as other variables may be changed or modified by those of ordinary skill in the art to arrive at suitable and preferred terpolymer resins useful in the present invention without undue experimentation.

Various VLDPEs are manufactured by and also available on either a commercial or experimental basis from Dow Chemical Company of Midland, Mich. U.S.A. and Union Carbide Corporation of Danbury, Conn., U.S.A.

Suitable VLDPE terpolymers useful in the present invention are made from copolymerization of ethylene with either 1-butene or 1-hexene, and at least one $C_6$–$C_8$ alpha-olefin. Suitable $C_6$–$C_8$ alpha-olefins include: 4-methyl-1-pentene; 1-hexene, and 1-octene. A preferred terpolymer comprises a VLDPE copolymer of ethylene, 1-butene and 1-hexene (hereinafter termed $C_2C_4C_6$ VLPDE terpolymer).

VLDPE terpolymers of ethylene with either 1-butene or 1-hexene and a $C_6$–$C_8$ alpha-olefin according to the present invention have a density of less than about 0.915 g/cm$^3$ as measured by ASTM Standard Test Method D 1505. Suitable terpolymers include those having a density between about 0.915 and 0.860 gm/cm$^3$ with those having a density ranging from 0.901 to 0.905 g/cm$^3$ being preferred and those having a density of about 0.905 g/cm$^3$ being especially preferred. Advantageously, the melt index (as measured by ASTM D-1238, Condition E) of the above terpolymers will be less than 2.0 dg/min with a melt index of 0.1 to 1.0 dg/min preferred, and a melt index of 0.1 to 0.3 dg/min. especially preferred as measured by ASTM Test Method 1238. It is believed that biaxially stretched film properties improve with decreasing melt index.

Suitable terpolymer resins for making biaxially stretched films of the present invention may have a melt flow ratio (Ratio of: Flow Index as measured by ASTM D-1238, Condition F to Melt Index as measured by ASTM D-1238, Condition E) ranging from below 35 to 100 or more. Preferred resins have a melt flow ratio (MFR) of at least 60 with an MFR of at least 100 being especially preferred and an MFR of at least 110 being most preferred. Processability of the inventive terpolymer film is greatly enhanced by use of the higher MFR terpolymer resins. Also, good film properties are exhibited with VLDPE terpolymer resins having melt flow ratios in excess of 60 with very good properties and processability evident in resins having an MFR greater than 110.

Suitable terpolymer resins employed in making the biaxially oriented films of the present invention may have a molecular weight distribution which ranges from narrow to broad. However, a VLDPE terpolymer resin having a broad molecular weight distribution is preferred. Resins with a broad molecular weight distribution greater than 10 as measured by ASTM D 3593 are preferred with a $\overline{M}_w/\overline{M}_n$ greater than 12 especially preferred. It is believed that terpolymer resins having a broad molecular weight distribution have improved processability via a tubular extrusion double bubble system such as that described in U.S. Pat. No. 3,456,044 (Pahlke). It is further believed that biaxially stretched terpolymer very low density polyethylene films of the present invention such as $C_2C_4C_6$ VLPDE terpolymer which are made from broad molecular weight distribution resins have surprisingly good properties including puncture resistance relative to similar films made from narrow molecular weight distribution terpolymer resins. A biaxially stretched film of the invention having a $\overline{M}_w/\overline{M}_n$ of about 12.5 has been found to have excellent film properties including puncture resistance and shrinkage value.

Suitable terpolymer resins according to the invention will be made by polymerization of three essential components. These three components comprise monomers (a), (b) and (c) wherein monomer (a) comprises ethylene, monomer (b) comprises a $C_6$–$C_8$ alpha-olefin, and monomer (c) comprises either 1-butene or 1-hexene. When monomer (c) comprises 1-hexene, then monomer (b) must comprise a $C_6$–$C_8$ alpha olefin other than 1-hexene. Terpolymers of the present invention will preferably have at least one percent by weight of polymer units derived from monomer (b).

The $C_6$–$C_8$ alpha-olefin comprises any $C_6$–$C_8$ alpha-olefin having a single double bond such as 4-methyl-1-pentene, 1-hexene and 1-octene. Alpha-olefins containing more than one double bond are believed to form rubber like compositions whose rubber like properties are undesirable in the present invention and are not employed as the necessary third component of the terpolymer, although the alpha-olefins having two or more double bonds may be added in small amounts as may many other materials as a minor fourth component or may be blended in with the terpolymer resins as a modifier. A preferred resin for forming a film according to the present invention comprises a VLDPE terpolymer of ethylene, 1-butene and 1-hexene. Also, suitable terpolymer resins may contain other components including processing aids, catalyst residues, and/or property enhancing additives. These suitable terpolymer resins may also be blended with one or more additional polymers or copolymers such as VLDPE, LDPE, HDPE, LLDPE, polypropylene, polyester, nylon, PVDC, EVA and ionomers.

Beneficially, the VLDPE terpolymer resins of the present invention will be copolymerized by adding either 1-butene monomer or 1-hexene monomer and a $C_6$–$C_8$ alpha-olefin monomer such as 1-hexene or 1-octene monomer to an ethylene monomer under polymerization conditions such that the resultant very low density polyethylene terpolymer resin having a density less than 0.915 g/cm$^3$ will comprise at least 80 weight percent of its polymer units derived from ethylene and preferably at least 85 weight percent polymer units derived from ethylene. As the amount of the ethylene monomer component decreases, there is a tendency towards less crystalline materials which are increasingly elastomeric. Materials which are exceedingly elastomeric present one or more problems for food package applications such as difficulty in controlling orientation to a set T.D. width, too soft to handle easily; weak puncture strength at elevated temperatures or in hot water; or excessive n-hexane extractables which are undesirable in food packaging.

Films of the present invention may also be further distinguished from undesirably rubber-like or elastomeric materials by melting point, Vicat softening point, and/or 1% secant modulus. Many synthetic rubbers lack a crystalline melting point. Terpolymer resins utilized in the present invention have a crystalline melting point which may be determined by differential scanning calorimetry (DSC) according to a method similar to ASTM D-3418 using a 5° C. per minute heating rate and a DuPont 9000 brand differential scanning calorimeter. Suitable resins may be differentiated from undesirably elastomeric materials by measurement of the crystalline melting point of suitable resins. This melting point is generally greater than about 110° C. Terpolymer resins having a melting point greater than about 125° C. are disadvantageously and decreasingly (with higher temperatures) difficult to process into biaxially stretched food packaging films. VLDPE terpolymer resins useful in the present invention have a melting point which is preferably between 115° C. and 125° C.

The Vicat softening point may also be used to further define the present inventions. Films of the present invention utilize VLDPE terpolymer resins which generally have a Vicat softening point greater than about 60° C. and preferably greater than 80° C. Materials having lower Vicat softening points are elastomeric rubber-like compositions which are disadvantageously difficult to dimensionally control during biaxial stretching.

Suitable VLDPE terpolymer containing films according to the present invention will beneficially have a 1% secant modulus at least about 10,000 p.s.i. (69 MPa). Films with lower values tend to be too soft for proper handling as food packaging films for use in e.g. poultry bags. Advantageously, food packaging films of the present invention will have a 1% secant modulus between about 10,000 to 40,000 p.s.i. (69–280 MPa); this range of softness provides a desirable degree of softness for ease of handling during both film manufacturing and food packaging operations.

Suitable resins include those in which the ratio of $C_6$–$C_8$ alpha-olefin to 1-butene or 1-hexene ranges from less than 1:1 to more than 3:1. Preferred terpolymer resins and films of the present invention having about a 3:1 ratio of polymer units derived from $C_6$–$C_8$ alpha-olefin to polymer units derived from 1-butene have been found to have a desired degree of crystallinity as reflected in such properties as melting point, 1% secant modulus and Vicat softening point as well as a desirable balance of film properties including high shrinkage values, dynamic puncture resistance and hot water puncture resistance. An especially preferred biaxially stretched, heat shrinkable film of the present invention will have at least 85 weight percent polymer units derived from ethylene and a ratio of polymer units derived from $C_6$–$C_8$ alpha-olefin (1-hexene preferably) to polymer units derived from 1-butene of about 3:1.

Advantageously, a preferred embodiment of the inventive heat shrinkable film will have a maximum extractable portion of 5.5 percent by weight of polymer in n-hexane at 50° C. for 2 hours as further described below. This 5.5 weight percent is the n-hexane extractable limit for olefin copolymers of the type employed by the present invention for use in articles that contact food except for articles used for packing or holding food during cooking. Beneficially, the maximum extractable portion as described above will be 2.6 percent in an especially preferred embodiment of the inventive film thereby qualifying the film for use in articles used in packing or holding food during cooking. The above maximum extractable limits correspond to current limits for a class of resins intended for use in contact with food as set forth and described by the U.S. Food & Drug Administration in 21 CFR 177.1520 (which description is hereby incorporated in its entirety by reference).

Suitable ethylene, 1-hexene, 1-butene VLDPE terpolymer resins for making the biaxially stretched heat shrinkable films of the present invention have been produced by Union Carbide Corporation. It is believed that in view of the present disclosure, those of ordinary skill in the art of making VLDPE resins may manufacture suitable terpolymer resins via known processes without undue experimentation.

As generally recognized in the art, resin properties may be further modified by blending two or more resins together and it is contemplated that the terpolymer resins described above may be blended with other resins such as other VLDPEs, LLDPE, LDPE, HDPE, ionomers, polypropylene or EVA. These resins and others may be mixed by well known methods using commercially available tumblers, mixers or blenders. Also, if desired, well known additives such as processing aids, slip agents, antiblocking agents, pigments, etc., and mixtures thereof may be incorporated into the film.

In a preferred process for making films of the present invention, the resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. For example, according to the present invention, in extrusion of the VLDPE terpolymers such as $C_2C_4C_6$ VLDPE terpolymers, barrel and die temperatures may range between about 165° C. and 180° C. However, variations are expected which may depend upon such factors as variation of terpolymer composition, use of other resins e.g. by blending or in separate layers in a multilayer film, the manufacturing process used and particular equipment and other process parameters utilized. Actual process parameters including process temperatures are expected to be set by one skilled in the art without undue experimentation.

In a preferred extrusion double bubble process of the type described in U.S. Pat. No. 3,456,044 the primary tube leaving the die is inflated by admission of air, cooled, collapsed, and then preferably oriented by reinflating to form a secondary bubble with reheating to the film's orientation (draw) temperature range. Machine direction (M.D.) orientation is produced by pulling or drawing the film tube e.g. by utilizing a pair of rollers travelling at different speeds and transverse direction (T.D.) orientation is obtained by radial bubble expansion. The oriented film is set by rapid cooling. Suitable machine direction and transverse direction stretch ratios are from about 3:1 to about 4:1 preferred.

Advantageously, thermoplastic biaxially stretched terpolymer films of the present invention exhibit one or more of the following properties:

(i) A dynamic puncture resistance greater than that for similarly made films comprising a copolymer of ethylene and a $C_6$–$C_8$ alpha-olefin without 1-butene.

(ii) A hot water puncture value of at least 20 seconds, preferably at least 60 seconds, and most preferably at least 120 seconds.

(iii) A shrinkage value of at least about 15 percent in at least one direction, (preferably at least 20 percent in the machine direction) and desirably at least about 20 percent (preferably at least 25 percent and most preferably at least 30 percent) in the transverse direction.

The following physical properties are used to describe the present film and are measured in the described manner.

Dynamic Puncture Resistance

The dynamic puncture resistance procedure is used to compare films for their resistance to bone puncture. It measures the energy required to puncture a test sample with a sharp pyramidal metal point made to simulate a sharp bone end. A Dynamic Ball Burst Tester, Model No. 13-8, available from Testing Machines, Inc., Amityville, Long Island, N.Y. is used, and a modified tip is installed on the tester probe arm for use in this test procedure. The modified tip is constructed from a ⅜ inch (0.95 cm) diameter conical tip having a configuration of a right circular cone with the angle between the cone axis and an element of the conical surface at the vertex being about 65°. Three equally spaced and abutting planar surfaces are machined to a smooth finish on the cone surface to form a pyramidal shaped point. At least six test specimens approximately 4 inches (10 cm) square are prepared, a sample is placed in the sample holder, and the pendulum is released. The puncture energy reading is recorded. The test is repeated until at least 6 samples have been evaluated. The results are calculated in cm-kg per mil of film thickness and are averaged.

Hot Water Puncture

Hot water puncture values for monolayer films are obtained by performing a hot water puncture test as follows. Water is heated to 98°±1° C. A ⅜ inch (0.95 cm) diameter round wooden dowel is sharpened on one end to a conical point. This sharpened point has the configuration of a right circular cone, and the angle between the cone axis and an element of the conical surface at the vertex is about 60°. This sharp point is then rounded to a spherical tip of about 1/16 inch (0.16 cm) diameter. The wooden dowel is fastened to a seven inch (17.8 cm) long wooden block so that the rounded point projects 1½ inches (3.8 cm) beyond the end of the wooden block.

A specimen about 3 inches (7.6 cm) wide in the machine direction (MD) and about eighteen inches (45.7 cm) long is cut from the test sample material. One end of the specimen is placed on the end of the wooden block opposite the pointed dowel. The specimen is wrapped around the end of the sharpened dowel and back to the wooden block on the opposite side, where it is secured. The film thickness in the area of contact with the sharpened dowel is measured in order to assure that the film specimen thickness is truly representative of the given test sample material.

The specimen and pointed dowel are quickly immersed five inches into the hot water and a timer is started. The timer is stopped when the wooden dowel point punctures the film specimen. The test procedure is repeated five more times with new 3 inch (7.6 cm) wide MD specimens from the given test sample material. The time required for penetration is recorded and then averaged for the six MD specimens. Resistance to puncture times of below 6-7 seconds are generally considered unacceptable, while times of 20 seconds or more are good, 60 seconds or more are very good and 120 seconds or more are excellent.

For multilayer films, the above procedure is followed except a similarly shaped stainless steel metal probe having an angle of 37° is substituted for the wood dowel and the water is heated to 95°±1° C.

The multilayer hot water puncture test has been found to be more severe than the monolayer test and resistance to puncture of six seconds or more is considered to be exceptionally good.

Shrinkage

The biaxially stretched films of the present invention are heat shrinkable. Biaxially stretched films are "heat shrinkable" as that term is used herein, if the film has an unrestrained shrinkage of at least 5 percent in two directions.

Shrinkage values are obtained by measuring unrestrained shrink of the stretched film at 90° C. for five seconds. Four test specimens are cut from a given sample of the oriented film to be tested. The specimens are cut to 10 cm. in the machine direction by 10 cm. in the transverse direction. Each specimen is completely immersed for 5 seconds in a 90° C. water bath. The distance between the ends of the shrunken specimen is measured. The difference in the measured distance for the shrunken specimen and the original 10 cm. is multiplied by ten to obtain the percent of shrinkage for the specimen. The shrinkage for the four specimens is averaged for the MD shrinkage values of the given film sample, and the shrinkage for the four specimens is averaged for the TD shrinkage value.

Shrink Force

The shrink force of a film is that force or stress required to prevent shrinkage of the film and was determined from film samples taken from each film. Four film samples were cut 1" (2.54 cm) wide by 7" (17.8 cm) long in the machine direction and 1" (2.54 cm) wide by 7" (17.8 cm) long in the transverse direction. The average thickness of the film samples was determined and recorded and a strip chart recorder was calibrated at 0 gram and at 1,000 grams full scale load. Each film sample was then secured between two clamps spaced 10 cm apart. One clamp is in a fixed position and the other is connected to a strain gauge transducer. The secured film sample and clamps were then immersed in a silicone oil bath maintained at a constant, elevated temperature for a period of five seconds. During this time, the force in grams at the elevated temperature was read from the strip chart and this reading was recorded. At the end of this time, the film sample was removed from the bath and allowed to cool to room temperature whereupon the force in grams at room temperature was also read from the strip chart and recorded. The shrink force for the film sample was then determined from the following equation wherein the result is obtained in grams per mil of film thickness (g/mil):

$$\text{Shrink Force (g/mil)} = \frac{F}{T}$$

wherein F is the force in grams and T is the average thickness of the film samples in mils.

The following are examples and comparative examples given to illustrate the present invention.

In all the following examples, unless otherwise indicated herein the film compositions were produced generally utilizing the apparatus and method described in U.S. Pat. No. 3,456,044 (Pahlke) (hereby incorporated by reference) which describes an extrusion type of double bubble method and in further accordance with the detailed description above. In all the examples below, unless otherwise noted, the extruded primary tube was biaxially oriented following the Pahlke method and wound on a reel. Those skilled in the art of manufacturing biaxially oriented films know of different and various processes for such manufacture and the present inventive films include biaxially oriented or stretched films regardless of the method used for their production. All percentages are by weight unless indicated otherwise.

Unless otherwise noted, the physical properties reported in the examples below were measured by either the test procedures described above or tests similar to the following methods.

Average Gauge: ASTM D-2103
Tensile Strength: ASTM D-882, method A
Secant Modulus: ASTM D-882, method A
Percent Elongation: ASTM D-882, method A
Molecular Weight Distribution: ASTM D-3593
Gloss: ASTM D-2457, 45° Angle
Haze: ASTM D-1003-52
Melt Index: ASTM D-1238, Condition E
Melt Flow Index: ASTM D-1238, Condition F
Melting Point: ASTM D-3418, DSC with 5° C./min. heating rate.
Vicat Softening Point: ASTM D-1525-82

All ASTM test methods noted herein are incorporated by reference into this disclosure.

EXAMPLE 1

In example 1 a biaxially stretched, heat shrinkable film of the present invention was made and physical properties of the film tested. This film was made from an experimental resin supplied by Union Carbide Corporation comprising a VLDPE terpolymer of ethylene, 1-butene, and 1-hexene having a density less than 0.915 g/cm$^3$. The as-received resin had a reported density of 0.905 g/cm$^3$, a melt index of 0.22 g/10 min., and a melt flow ratio (MFR) of 112. The melt flow ratio is the ratio of the melt flow index to the melt index. This most preferred VLDPE terpolymer resin had a broad molecular weight distribution which is reportedly 12.45. Molecular weight distribution may be measured by known methods e.g. size exclusion chromatography. This terpolymer resin is believed to have been made from at least 85 weight percent ethylene monomer and an approximately 3:1 ratio of 1-hexene to 1-butene monomer. The Vicat softening point of this resin was reported at 82.5° C. The melting point was measured at 121° C. by DSC.

This terpolymer resin was uniformly mixed with 4.4 weight percent of a processing aid comprising a 1.7% fluorocarbon elastomer in a LLDPE base sold by Quantum Chemical Corporation under the brand name Nortech CM-1607, and 5 weight percent of a color concentrate and placed in a hopper attached to a standard single screw extruder equipped with a standard 1½ inch (3.81 cm) diameter annular die.

The resin mixture was fed from the hopper into the extruder and was heat plastified and extruded into a primary tube. The extruder barrel and die temperature were set at about 350° F. (177° C.) and 370° F. (188° C.) respectively. The melt temperature was measured at about 160° C. at the extruder head and the melt pressure was about 5200 p.s.i. (36 MPa) as measured at the screw tip.

This primary tube was then biaxially stretched according to a double bubble process and the resultant biaxially stretched film wound on a reel. The machine direction (M.D.) orientation ratio was about 3.6:1 and the transverse direction (T.D.) orientation ratio was about 4:1. Draw point temperature, bubble cooling rates and orientation ratio were adjusted to maximize bubble stability.

The film produced in Example 1 processed well with no noticable gels or melt fracture. The film had an average gauge of 2.50 mils (64 microns). The M.D./T.D. tensile strength at room temperature was measured at about 9,300/10,100 p.s.i. (64/70 MPa), respectively, indicating good film strength relative to present commercial films such as those comprised of ethylene vinyl acetate (EVA) which generally have an M.D./T.D. tensile strength of about 9,000/10,000 p.s.i. (62/69 MPa). The elongation at break at room temperature was measured to be about 225% in the machine direction and 210% in the transverse direction. The 1% secant modulus was measured at about 17,400 p.s.i. (120 MPa) in the machine direction and 19,400 p.s.i. (134 MPa) in the transverse direction indicating good film handling characteristics e.g. in the gathering and closing an open end of a poultry bag. This film had excellent shrink characteristics with M.D./T.D. shrinkage values of 27/35 percent. Also, there was good high temperature (measured at 90° C.) M.D./T.D. shrink force of 105/165 g/mil (41/65 kg/cm) and residual shrink force at room temperature of 65/100 g/mil (26/39 kg/cm) generally equivalent to presently commercialized poultry bags made from EVA. The puncture resistance properties were also examined. The 2.2 cmkg/mil (87 cmkg/cm) (0.09 cmkg/micron) dynamic puncture resistance was very good and the hot water puncture time at 98° C. of over 120 seconds for an average sample film gauge of 2.69 mils (68.3 microns) was excellent for poultry bag applications.

The physical properties of the above biaxially oriented, heat shrinkable thermoplastic flexible film were all very good for film packaging applications with very desirable levels of shrinkability and puncture resistance. In particular, this film of the invention showed a unique and surprising combination of desirable puncture resistance properties with high shrinkage values. Individual film properties were as good or better than films used in commercially available poultry bags. The unique combination of excellent high shrinkage values with excellent hot water puncture resistance times and very good dynamic puncture resistance is previously unknown.

EXAMPLES 2-4

In examples 2-4 a series of monolayer films were made from different very low density polyethylene (VLDPE) resins. Several physical properties of these films were measured and are presented in Table 1. Examples 2-3 are comparative (not of the invention), while example 4 is a film according to the present invention. Example 1 as described above is included in the table as representative of an inventive film having a broad molecular weight distribution in contrast to the comparative examples (not of the invention) 2 and 3 and example 4 (a film of the present invention) all of which have a narrow molecular weight distribution. Since some process conditions such as orientation ratio varied between example 1 and the remaining examples in Table 1, the values obtained for example 1 should not be directly compared to those of examples 2–4, but nonetheless do indicate that a desirable combination of properties may be obtained for the inventive films.

In comparative example 2 a VLDPE copolymer of ethylene and 1-butene (commercially available from Union Carbide Corporation (UCC) of Danbury, Conn. under the brand designation UCAR DFDA 1137 Natural 7) having a reported density of 0.905 g/cc and a melt index of 1.0 was fed by hopper to a standard single screw extruder equipped with a standard 1½ inch (3.81 cm) diameter annular die. The resin was heat plastified and extruded into a primary tube. This primary tube was then biaxially stretched according to a double bubble process and the resultant biaxially stretched film wound on a reel as described above for example 1.

In comparative example 3, a VLDPE copolymer of ethylene and 1-hexene (available as an experimental resin from UCC under the brand designation DEFD 1569) having a reported density of 0.910 g/cc and a melt index of 1.0 was made into a biaxially oriented film by an extrusion type double bubble process as described for examples 1–2.

In example 4 of the invention, a VLDPE terpolymer of ethylene, 1-butene, and 1-hexene (an experimental resin provided by Union Carbide Corporation) having a reported density of 0.904 g/cm$^3$, a melting point of about 122° C. and a 0.71 dg/min melt index was made into a biaxially oriented film by the process as described for examples 1–2. The melt flow index is reported at 24.4 dg/min. and melt flow ratio at 34.2 and the Vicat softening point at 80.2° C. This resin of the invention as well as the comparative examples 2–3 above has a narrow molecular weight distribution (less than 10).

In all of the examples 2–4 the following process conditions were utilized. The extruder barrel and die temperatures ranged from about 350°–375° F. (177°–191° C.). The machine direction (M.D.) orientation ratio was from about 4.1:1 to 4.3:1 and the transverse direction (T.D.) orientation ratio was from 4.0:1 to 4.2:1. Draw point temperature, bubble cooling rates and orientation ratios were adjusted to maximize bubble stability.

The average gauge of each film was measured by a method similar to ASTM D-2103 and various other physical properties measured by tests described above. These test results are reported in Table 1.

Referring to Table 1, the dynamic puncture resistance test was performed on six samples for each example and the averaged results reported.

Surprisingly, the dynamic puncture resistance is significantly improved for the inventive biaxially oriented, heat shrinkable flexible film of example 4, comprising an ethylene, 1-butene, 1-hexene very low density polyethylene relative to similarly produced films of the ethylene, 1-butene VLDPE of comparative example 2 or the ethylene, 1-hexene VLDPE of comparative example 3. This higher puncture resistance for the biaxially stretched $C_2C_4C_6$ terpolymer film would not be expected or predicted from the results of comparative examples 2–3.

Shrinkable poultry bags need to have sufficient shrinkage to conform the film to the irregular shape of a bird during and after packaging. Each film's unrestrained shrinkage at 90° C. for 5 seconds was measured in both M.D. and T.D. directions and reported as a percentage of the original dimensions. An average shrinkage percent for four samples is reported. Examples 1 and 4 of the present invention show very good shrinkage values with over 20% shrinkage in the machine direction and over 30% shrinkage in the transverse direction.

Use of shrinkable films to package goods including red meat or poultry typically entails passage of the packaged goods through a shrink tunnel or other means to apply elevated temperatures to the film to induce shrinkage. Protuberances such as sharp bones or wing tips of birds may cause punctures during typical shrink procedures of packaging operations. The hot water puncture resistance test measures the resistance to puncture under conditions of elevated temperature. Typical shrink procedures expose products such as poultry or red meat to elevated temperatures for up to 6–8 seconds. Therefore, a minimum of 15–20 seconds resistance to puncture is desired at elevated temperature to provide a margin of safety to avoid the costs associated with defective packaging. Preferably, films suitable for packaging poultry will have an average hot water puncture value of at least about 60 seconds and most preferred are films having a hot water puncture resistance of 120 seconds or more. As seen from the results in Table 1, examples 1 and 4 of the present invention and comparative example 3 meet or exceed the preferred

TABLE 1

| # | VLDPE Resin | AVG. GAUGE mil (micron) | DYN. PUNC. cmkg/mil (cmkg/ micron) | HOT WATER PUNC. sec./mil /(micron) | SHRINK at 90° C. % M.D./T.D. | Tensile Strength × 10$^3$ psi (MPa) M.D./T.D. | Secant Modulus at 1% × 10$^3$ psi (MPa) M.D./T.D. | Elongation at break % M.D./T.D. |
|---|---|---|---|---|---|---|---|---|
| 1 | $C_2C_4C_6$* | 2.50 (64) | 2.2 (.089) | 120+/2.69 /(68) | 27/35 | 9.3/10.1 (64/70) | 17.4/19.4 (120/134) | 225/210 |
| 2 | $C_2C_4$** | 2.17 (55) | 2.0 (.079) | 12/1.77 /(45) | 25/33 | 7.9/7.9 (54/54) | 20.6/21.1 (142/145) | 275/240 |
| 3 | $C_2C_6$*** | 1.92 (49) | 2.0 (.079) | 120+/1.94 /(49) | 14/23 | 10.7/10.8 (74/74) | 31.6/34.9 (218/241) | 210/195 |
| 4 | $C_2C_4C_6$**** | 2.10 (53) | 2.3 (.091) | 69/2.28 /(58) | 22/33 | 8.8/9.4 (61/65) | 18.8/18.0 (130/124) | 200/225 |

*Experimental VLDPE terpolymer of ethylene, 1-butene and 1-hexene having a density of 0.905 g/cc, a melt index of 0.22, and a broad molecular weight distribution.
**Commercially available VLDPE copolymer of ethylene and 1-butene sold by Union Carbide Corporation of Danbury, Connecticut under the brand designation DFDA 1137, Natural 7 and having a reported density of 0.906 g/cc and 1.0 melt index.
***Experimental VLDPE copolymer of ethylene and 1-hexene sold by Union Carbide Corporation of Danbury, Connecticut under the brand designation DEFD 1569 and having a reported density of 0.905 g/cc and 1.0 melt index.
****Experimental VLDPE terpolymer of ethylene, 1-butene and 1-hexene having a density of 0.904 g/cc, a melt index of 0.71, and a narrow molecular weight distribution.
+Ten samples were tested. Six samples with an average gauge of 1.80 mil had an average hot water puncture time of 84.6 seconds. Four samples having an average gauge of 1.85 mil resisted puncture in excess of the maximum test time of 120 seconds.

sixty second time interval of puncture resistance at elevated temperature. The comparative ethylene, 1-butene film of example 2 has an undesirably low value for hot water puncture resistance.

Although not reported in Table 1 since tests were not run on the comparative films, the shrink force of the inventive film of example 4 was measured at 90° C. to determine a film's ability to pull the wings of a processed bird in close to the body of the bird. The required force to do this is particularly high for turkeys. The residual force was also measured at room temperature after the film cooled. This residual force is very important to ensure a long lasting tight package. Relaxation of the film produces a poorer product appearance, increases the storage space requirements for packaged birds and also increases the likelihood that the packaging film may be torn or otherwise damaged.

The inventive film of example 4 has a good M.D./T.D. shrink force of 110/145 gm/mil (43/57 kg/cm) at initial shrinking temperatures (90° C.) and an acceptable residual force of 65/95 gm/mil (26/37 kg/cm) at room temperature for packaging items such as poultry.

Since the films of the present invention are made from new ethylene, 1-butene, $C_6$–$C_8$ alpha-olefin VLDPE terpolymer resins, and biaxially stretched film properties of these resins have not yet been taught in the art, those of ordinary skill in the art would not be able to predict with confidence the useful physical properties of the biaxially stretched heat shrinkable terpolymer VLDPE films of the present invention. Especially unpredictable is the desirable combination of high shrinkage values and puncture resistance (particularly hot water puncture resistance) as demonstrated by the $C_2C_4C_6$ films of examples 1 and 4. While methods have been previously disclosed in the art to make polyethylene terpolymers, the biaxially stretched film properties of ethylene, 1-butene, $C_6$–$C_8$ alpha-olefin terpolymers such as ethylene, 1-butene, 1-hexene VLDPE terpolymers have remained unexplored. One of ordinary skill in the art would not expect to be able to accurately predict the properties of these inventive terpolymers based upon knowledge of either two component copolymers of $C_2C_4$, or ethylene, $C_6$–$C_8$ alpha-olefin, or be able to predict based upon other known terpolymers such as ethylene, propylene, and ethylidene norbornene (See EP publication No. 120,503).

EXAMPLES 5–8

In examples 5–8, a series of monolayer films were made according to the process described above with respect to examples 1–4.

Example 5 is a comparative example (not of the invention) of a VLDPE film comprising a copolymer of ethylene and 1-octene (commercially available from The Dow Chemical Company of Midland, Mich. under the brand designation Attane 4001) having a reported density of 0.912 g/cc and a 1.0 melt index. Examples 6–8 are of the invention.

Example 6 is a biaxially drawn film of the present invention comprising an ethylene, 1-butene, 1-hexene VLDPE terpolymer having a density of about 0.901 g/cm$^3$, a melt index of 0.24 dg/min., a melt flow index of 17.1 dg/min, and a melt flow ratio (MFR) of about 71. The crystalline melting point was measured at 118° C. using differential scanning calorimetry, (DSC). This terpolymer composition had a broad molecular weight distribution with a $\overline{M}_w/\overline{M}_n$ value of 10.5 reported.

$\overline{M}_w/\overline{M}_n$ may be measured by size exclusion chromatography (ASTM 3593). This terpolymer resin was made with a reported 1-hexene: 1-butene monomer ratio of about 3:1.

Example 7 is a biaxially drawn film of the present invention comprising an ethylene, 1-butene, 1-hexene VLDPE terpolymer having a density of about 0.903 g/cm$^3$, a melt index of about 0.25, a melt flow index of about 17.3 and a melt flow ratio of about 70. The crystalline melting point was measured at 121° C. by DSC. This terpolymer also has a broad molecular weight distribution (11.9) which may be measured by size exclusion chromatography. This terpolymer resin was made with a reported 1-hexene: 1-butene monomer ratio of about 3:1.

Example 8 is a biaxially drawn film of the present invention comprising an ethylene, 1-butene, 1-hexene VLDPE terpolymer having a density of about 0.903 g/cm$^3$, a melt index of about 0.26 dg/min a melt flow index of about 18.1 dg/min., and a melt flow ratio of about 69. The crystalline melting point was measured at 118° C. by DSC. This terpolymer has a broad molecular weight distribution and was made with a reported 1-hexene: 1-butene monomer ratio of about 1:1. The ethylene monomer content in forming the terpolymer resins of examples 7, 8 and 9 was believed to exceed 80 weight percent.

Physical properties were measured as with examples 1–4 and the results reported in Table 2. Reported test values in Table 2 are not directly comparable to those of Table 1 since orientation conditions varied slightly. In particular, for examples 5–8 the machine direction (M.D.) orientation ratio (draw ratio) was from 4.6:1 to 4.8:1 and the transverse direction (T.D.) orientation ratio was from 3.7:1 to 3.8:1.

Referring to Table 2, all films made from terpolymer resins according to the present invention (examples 6–8) are shown to have very good dynamic puncture and hot water puncture resistance relative to commercialized films used in poultry bags. Typical values for commercial films are 3–6 cmkg for dynamic puncture resistance and 20–120 seconds for hot water puncture resistance for a single layer film of 2.25–2.5 mils (57–64 microns) thickness.

Example 5 is a comparative example of a VLDPE copolymer of ethylene and 1-octene which is a highly regarded resin currently used in commercial heat shrinkable packaging films. Octene monomer is generally more expensive than butene or hexene monomer and very low density polyethylene made from octene monomer generally has better puncture resistance properties than 1-butene based VLDPE. Also, known two component ethylene, 1-octene VLDPEs have lower maximum shrinkage values compared to either 1-butene based two component VLDPE or to the present invention. Higher shrinkage values contribute to improved package appearance.

As seen from Table 2, the inventive biaxially stretched, heat shrinkable VLDPE terpolymers are superior to 1-octene based VLDPE in shrinkage values and machine direction shrink force. The inventive films and film of the comparative example all have excellent hot water puncture times and very good dynamic puncture values. In particular, example 8 of the invention shows exceptionally good shrink which is greatly superior to the shrinkage values for comparative example 5 and at the same time has very good dynamic puncture resistance values and excellent hot water puncture resistance times.

The measured values of tensile strength, secant modulus and elongation at break indicate that the biaxially oriented, heat shrinkable flexible films made from VLDPE terpolymer according to the present invention are films having sufficient strength and flexibility for a variety of packaging applications including food packaging. Relative to the octene based two component VLDPE film of comparative example 6, the novel terpolymer VLDPE films all are easier to handle as indicated by their substantially lower secant modulus values while maintaining approximately equivalent tensile strength. In food packaging applications, bags made from softer films (lower secant modulus) are easier to gather and close by clipping means.

However, films having a 1% secant modulus below 10,000 p.s.i. (69 MPa) tend to be too soft for ease of handling. Ideally, films will be soft enough to be easily manipulated in the packaging process e.g. for gathering and closing an open bag end, yet these films will also be hard enough to have sufficient body to be easily manipulated and not be so soft as to be limp or clingy. Films with a 1% secant modulus between about 10,000 to 40,000 p.s.i. (69–280 MPa) provide a desirable degree of softness which facilitates handling.

Table 2 further demonstrates that biaxially stretched, heat shrinkable $C_2C_4C_6$ terpolymer films of the present invention provide films having physical properties which are comparable to VLDPE film made from a higher monomer viz 1-octene. Moreover, it is believed without wishing to be bound by that belief that biaxially stretched, heat shrinkable films made from terpolymer resins of ethylene, 1-butene, and a $C_6$–$C_8$ alpha-olefin such as ethylene, 1-butene 1-hexene VLDPE terpolymers having a low melt index have improved film properties for packaging applications relative to similar resins having a relatively high melt index of 1.0 dg/min or higher.

The low melt indices of the preferred terpolymers (including the especially preferred terpolymer of example 1) necessitate that these resins have a higher melt flow index for processability. The melt flow ratio (MFR) which is a ratio of the melt flow index to the melt index is a measure of the processability of the suitable and preferred terpolymer resins used in the films of the present invention. Advantageously, for ease of processability during film manufacture the melt flow ratio will be greater than 65 and preferably greater than 100. It is further believed that all of the terpolymer resins in examples 6, 7 and 8 were formed with an ethylene content of at least 85 weight percent and with a 3:1 ratio of 1-hexene monomer to 1-butene monomer except for example 8 which is believed to have a 1:1 ratio of 1-hexene to 1-butene.

TABLE 2

| # | VLDPE Resin | AVG. GAUGE mil (micron) | DYN. PUNC. cmkg/mil (cmkg/micron) | HOT WATER PUNC. sec./mil /(micron) | SHRINK at 90° C. % M.D./T.D. | SHRINK FORCE at 90° C. gm/mil (Kg/cm) M.D./T.D. | SHRINK FORCE at RT gm/mil (Kg/cm) M.D./T.D. | Tensile Strength × 10³ psi (MPa) M.D./T.D. | Secant Modulus at 1% × 10³ psi (MPa) M.D./T.D. | Elongation at break % M.D./T.D. |
|---|---|---|---|---|---|---|---|---|---|---|
| 5 | $C_2C_8$* | 2.49 (63) | 2.6 (.10) | 120+/2.58 /(66) | 18/57 | 115/185 (45/73) | 50/130 (24/51) | 12.5/12.1 (86/83) | 22.8/21.4 (157/148) | 205/235 |
| 6 | $C_2C_4C_6$** | 2.26 (57) | 2.3 (.091) | 120+/2.09 /(53) | 45/47 | 155/150 (61/59) | 75/75 (30/30) | 12.3/11.4 (85/79) | 12.8/13.6 (88/94) | 190/210 |
| 7 | $C_2C_4C_6$*** | 2.34 (59) | 2.3 (.091) | 120+/1.93 /(49) | 40/43 | 160/150 (63/59) | 75/75 (30/30) | 12.8/11.1 (88/77) | 14.0/15.2 (97/105) | 200/200 |
| 8 | $C_2C_4C_6$**** | 2.27 (58) | 2.5 (.098) | 120+/1.96 /(50) | 42/45 | 150/145 (59/57) | 70/80 (28/31) | 10.8/10.1 (74/70) | 14.8/15.1 (102/103) | 195/215 |

*Commercially available VLDPE copolymer of ethylene and 1-octene sold by the Dow Chemical Company of Midland, Michigan under the brand designation Attane 4001 and having a reported density of 0.912 g/cc and 1.0 melt index.
**Experimental $C_2C_4C_6$ VLDPE terpolymer provided by Union Carbide Corporation of Danbury, Connecticut having a reported density of 0.901 g/cc, and a 0.24 dg/min. melt index.
*** Experimental $C_2C_4C_6$ VLDPE terpolymer provided by Union Carbide Corporation of Danbury, Connecticut having a reported density of 0.903 g/cc and 0.25 dg/min melt index.
****Experimental VLDPE terpolymer of ethylene, 1-butene and 1-hexene provided by Union Carbide Corporation of Danbury, Connecticut having a density of 0.903 g/cc and a melt index of 0.26.

EXAMPLES 9–12

The suitability of an ethylene, 1-butene, and a $C_6$–$C_8$ alpha-olefin VLDPE terpolymer in at least one layer of a biaxially stretched, heat shrinkable multilayer film for packaging fresh red meat or processed meat was examined.

In examples 9–12, four multilayer films were coextruded and biaxially oriented according to a coextrusion type of double bubble process such as that described in U.S. Pat. No. 3,456,044 (Pahlke). This process was similar to that described above for examples 1–4 except that one extruder was used for each layer and the heat plastified resins from each extruder were introduced to a coextrusion die from which resins were coextruded in a first outer:core:second outer layer ratio of about 5:2:3.

Examples 9–12 are three layered films. However, multilayer films of 2 or 4 or more layers are contemplated by the present invention. The inventive multilayer films may include tie or adhesive layers as well as layers to add or modify various properties of the desired film such as heat sealability, toughness, abrasion resistance, puncture resistance, optical properties, gas or water barrier properties, and printability. These layers may be formed by any suitable method including coextrusion, extrusion coating, and lamination.

In examples 9–12 the coextruded film was oriented as for examples 1–4 except as noted below. The extruder barrel temperatures for the core layer ranged from 280° to 290° F. (138°–143° C.) and for the second outer layer ranged from about 325° to 335° F. (163°–168° C.) and the first outer layer ranged from about 300° to 320° F. (149°–160° C.). The coextrusion die temperature profile was set at about 275° F. (135° C.) to about 310° F. (154° C.). The M.D. orientation ratio was 4.0:1 to 4.5:1 and the T.D. orientation ratio was 3.9:1 to 4.7:1 for all films.

In all the examples 9–12 the extruded primary tube was wound on a reel and subsequently biaxially oriented following the Pahlke method. An interval of about one day occured between extrusion of the primary tube and biaxial orientation due to equipment availability. It is believed that this delay promoted crystallization in the primary tube thereby reducing shrinkage of the film. It is further contemplated that use of a process which is continuous from primary extrusion through biaxial orientation will provide increased shrink percentages for films which are otherwise similarly made. Those skilled in the art of manufacturing biaxially oriented films know of different and various processes for such manufacture and the present inventive films include biaxially oriented or stretched films regardless of the method used for their production.

The average gauge and other physical properties were measured and are reported in Table 3. For all the examples 9–12, the core layer comprised a 3:1 blend of commercially available vinylidene chloride-methylacrylate copolymer and vinylidene chloride-vinyl chloride copolymer and the outer layer comprised a linear low density polyethylene (LLDPE). The core layer and second outer layer resins used in examples 10–12 were identical to the resins used in example 9. All the VLDPEs used in examples 9–12 were mixed with 25% by weight of the total resin mixture for that layer of a commercially available ethylene vinyl acetate copolymer (10% vinyl acetate), and 4.4 weight percent of a 1.7% fluorocarbon elastomer in a LLDPE base processing aid such as that sold by Quantum Chemical Corp. under the brand name Nortech CM-1607.

Such additional film layers may comprise such polymers as linear low density polyethylene, very low density polyethylene, low density polyethylene, high density polyethylene, ionomer, ethylene-vinyl acetate copolymer, nylon or mixtures thereof.

In another aspect of the invention, one or more layers having gas barrier properties may be incorporated into multilayer film as either an intermediate or surface layer or both. For example, ethylene vinyl alcohol copolymer (EVOH), vinylidene chloride methacrylate copolymer, nylons such as nylon 6, or amorphous nylon, vinylidene chloride-vinyl chloride copolymer, acrylonitriles or other materials having oxygen barrier properties may be used in one or more layers such as the core layer.

Example 9 is a comparative example not of the invention and comprised a first outer layer having an experimental resin (provided by Union Carbide Corp. of Danbury, Conn.) having a 1-butene VLDPE with a reported density of 0.905 g/cm$^3$ and a melt index of 0.25 dg/min. This resin has a reportedly broad molecular weight distribution.

Example 10 is a comparative example (not of the invention). The coextruded multilayer film of example 10 was similar in composition to example 9 except that the first outer layer was comprised of an experimental ethylene, 1-hexene VLDPE produced by Union Carbide Corporation of Danbury, Conn. having a reported density of 0.905 g/cm$^3$ and a melt index of 0.25 dg/min. This resin reportedly has a broad molecular weight distribution. This resin was blended with a processing aid and color concentrate as described for example 9.

Example 11 is a comparative example (not of the invention). The coextruded multilayer film of example 11 was similar in composition to example 9 except that the VLDPE of the first outer layer was comprised of a 1-octene VLDPE sold by Dow Chemical Co. of Midland, Mich. under the brand name Attane 4001. This is the same resin previously described in example 5. This resin reportedly has a narrow molecular weight distribution.

Example 12 is an example of the present invention. The coextruded multilayer film of example 12 was similar in composition to that of example 9 except that the VLDPE of the first outer layer comprised an ethylene, 1-butene, 1-hexene VLDPE terpolymer according to the present invention. This VLDPE terpolymer resin used in example 12 is the same as that discussed in example 1 above and has a reported density of 0.905 g/cm$^3$, a Vicat softening point of 82.5° C., a melt index of 0.22 dg/min, a melt flow index of 24.7 dg/min, a MFR of about 112 and a broad molecular weight distribution of 12.45. The melting point of this terpolymer resin was measured to be 121° C. by differential scanning calorimetry. It is believed that this terpolymer resin was made with at least 85% weight percent ethylene and a 3:1 ratio of 1-hexene to 1-butene.

Example 12 demonstrates that a coextruded multilayer film having at least one layer comprising a terpolymer VLDPE of ethylene, 1-butene and a C$_6$–C$_8$ alpha-olefin may be made having useful properties for shrink packaging of, for example, fresh red meat. In particular, multilayer films according to the present invention may be usefully employed to package fresh red meat including primal and subprimal cuts as well as cheese or other food products.

It is contemplated that additional resins may be added to the VLDPE terpolymer in accordance with the present invention in amounts of up to 50 weight percent or more. Indeed it is believed that minor amounts (less than 50 weight percent) or small amounts (less than 10 weight percent) of the disclosed VLDPE terpolymer may be usefully employed to modify or blend with other resins such as LLDPE, VLDPE, LDPE, HDPE, ionomer, EVA or polypropylene in forming useful biaxially oriented, heat shrinkable films according to the present invention. The VLDPE terpolymer of the present invention may be utilized in one or more intermediate or surface layers or combination thereof in a multilayer film.

Referring to Table 3, several properties of the inventive film of example 12 are compared to those for a film made with a commercial VLDPE resin such as that in example 11 having a narrow molecular weight distribution that has gained wide acceptance in packaging films, and also to two experimental VLDPE resins both having a broad molecular weight distribution (examples 9 and 10). It is seen that the inventive biaxially oriented multilayer film of example 12 has very good dynamic puncture resistance and equivalent shrinkage and acceptable hot water puncture times relative to the films of the comparative examples 9–11. Also, the glossiness of the inventive multilayer film of example 13 compares favorably with the multilayer films of comparative examples 9–11.

EXAMPLES 13–16

The multilayer films of examples 9–12 were irradiated after orientation with 3.5 Mrad by electron beam according to methods well known in the art. The irradiated examples of 13–16 corresponds to unirradiated examples 9–12.

Physical properties of the irradiated multilayer films were tested and are reported in Table 3. The novel film of the present invention (example 16) showed very good to excellent puncture properties with dynamic puncture resistance as high or higher than butene, hexene, or octene-based two component VLDPE copolymer films of examples 13–15. The dynamic puncture resistance value of the inventive film remained very good following irradiation and the hot water puncture resistance times of all films were improved by irradiation to excellent values. Hot water puncture for all multilayer films tested herein were conducted using a metal probe at 95° C. as described earlier. Use of a metal probe is a more strenuous test of puncture resistance. Irradiation usually reduces the shrinkage values, however the shrinkage values for the inventive film of example 16 are acceptable and compare favorably to the butene, hexene and octene comparative examples 13–15. The shrinkage values for the octene based VLDPE film of comparative example 15 are undesirably low for food packaging applications.

Two additional tests were conducted on the irradiated films namely shrink force and impulse seal range. The shrink force was measured at elevated temperature and also the residual shrink force was examined. Both shrink force values of the inventive film were generally superior to those of comparison films. The impulse seal range for comparative example 14 was undesirably narrow. The inventive film had a good range comparable to comparative example 16 which utilized an octene based VLDPE widely used in biaxially oriented, heat shrinkable and sealable food packaging films.

Examples 13–16 demonstrate that properties such as high temperature puncture resistance of the inventive multilayer films, may be improved by irradiation. It is further believed that the same may be improved for inventive single layer films by either irradiation e.g. by an electron beam and/or chemical crosslinking according to known methods. Preferably, the entire film is irradiated after orientation. Alternatively, one or more single layers may be oriented and irradiated and optionally formed into a multilayer film by lamination processes with other irradiated or nonirradiated layers. A suitable irradiation dosage is irradiation up to 10 Mrad with irradiation from 1 to 5 Mrad preferred. Known irradiation procedures may be utilized. Various procedures are described in U.S. Pat. No. 4,044,187. Irradiation is utilized to improve heat sealing characteristics. Excess irradiation may cause deleterious film discoloration and/or a reduction in shrinkage values.

In another aspect of this invention, bags suitable for the shrink-packaging of food articles such as poultry, primal meat cuts, and processed meats are provided from the aforedescribed films. The bags are produced from the monolayer and multilayer films of this invention by heat sealing. For instance, if the films of this invention are produced in the form of tubular film, bags can be produced therefrom by heat sealing one end of a length of the tubular film or by sealing both ends of the tube end, then slitting one edge to form the bag mouth. If the films of this invention are made in the form of flat sheets, bags can be formed therefrom by heat sealing three edges of two superimposed sheets of film. When carrying out the heat sealing operation, in one embodiment of the invention, the surfaces which are heat sealed to each other to form seams are the first outer layers of the multilayer films of the invention. Thus, for example, when forming a bag by heat sealing one edge of a length of a tubular film, the inner surface of the tube, i.e., the surface which will be heat sealed to itself, will be the first outer layer of the film. In other embodiments of the invention, the VLDPE terpolymer containing layer may be a core layer, a second outer layer or an intermediate layer. Also, the above noted VLDPE terpolymer of monomer (a) comprising ethylene, monomer (b) comprising a $C_6$-$C_8$ alpha-olefin and monomer (c) comprising 1-butene or 1-hexene, may be incorporated in one, two, three or more layers of a multilayer film.

The voltage range for impulse sealing of film was also examined to determine the acceptable range for producing a seal of sufficient strength and integrity. In this test two four inch wide (T.D. direction) samples are cut from a tubular film. An impulse sealer equipped with coolant flow controls for impulse time, cooling time, seal bar, coolant flow and pressure was set at the following conditions:

0.5 seconds impulse time (upper ribbon only)
2.2 seconds cooling time
50 p.s.i. (345 kPa) jaw pressure
0.3 gallon per minute (1 liter per minute) cooling water flow One of the samples is folded in half for use in determining a minimum sealing voltage. This folding simulates folding which may inadvertently occur during conventional bag sealing operations. The folded sample which now has four layers is placed into the sealer and by trial and error the minimum voltage to seal the bottom two layers to each other is determined.

The maximum voltage is then determined for the two layer sample by placing it in the sealer and then activating the seal bar. The film sample is manually pulled with about 0.5 pounds of force to induce seal burn-through. The maximum voltage which does not cause burn-through or significant distortion of the seal is determined. The minimum and maximum seal voltage are reported in Table 3. A broad impulse seal range as measured by the maximum and minimum voltage range is desirable for avoiding weak or noncontinuous seals and seal distortion and burn-through. A broad range allows for greater film variability and reduces the potential for operator error and further allows for greater flexibility in sealing operations. Referring to the examples, the inventive VLDPE terpolymer containing film has a suitable impulse seal range which is equivalent to that of comparative example 15 which utilized a commercially accepted octene based VLDPE resin. The impulse seal range of the butene based VLDPE containing comparative film of example 13 was also acceptable whereas the range for the hexene based VLDPE containing comparative film was undesirably narrow.

TABLE 3

| # | First Outer Layer[++] | Core Layer | Second Outer Layer | IMPULSE SEAL RANGE (VOLTS) | AVG. GAUGE mil (micron) | DYN. PUNC. cmKg/mil (/micron) | HOT WATER PUNC. sec./mil /(micron) | SHRINK at 90° C. (%) M.D./T.D. | SHRINK FORCE at 90° C. gm/mil (Kg/cm) M.D./T.D. | SHRINK FORCE at RT gm/mil (Kg/cm) M.D./T.D. | GLOSS at 45° Angle |
|---|---|---|---|---|---|---|---|---|---|---|---|
| 9 | 1-butene VLDPE* | PVDC blend[+++] | LLDPE | — | 1.77 (45) | 2.4 (.095) | 120+/1.77 /(45) | 17/21 | — | — | 83 |
| 10 | 1-hexene | PVDC | LLDPE | — | 2.12 | 2.3 | 120+/2.09 | 16/20 | — | — | 80 |

TABLE 3-continued

| | MULTILAYER FILM COMPONENTS | | | IMPULSE SEAL RANGE (VOLTS) | AVG. GAUGE mil (micron) | DYN. PUNC. cmKg/mil (/micron) | HOT WATER PUNC. sec./mil /(micron) | SHRINK at 90° C. (%) M.D./ T.D. | SHRINK FORCE at 90° C. gm/mil (Kg/cm) M.D./ T.D. | at RT gm/mil (Kg/cm) M.D./ T.D. | GLOSS at 45° Angle |
|---|---|---|---|---|---|---|---|---|---|---|---|
| # | First Outer Layer++ | Core Layer | Second Outer Layer | | | | | | | | |
| | VLDPE** | blend+++ | | | (54) | (.091) | /(53) | | | | |
| 11 | 1-octene VLDPE*** | PVDC blend+++ | LLDPE | — | 1.87 (47) | 1.7 (.067) | 11/1.82 /(46) | 14/22 | — | — | 78 |
| 12 | C2C4C6 VLDPE**** | PVDC blend+++ | LLDPE | — | 1.96 (50) | 2.6 (.10) | 28/1.95 /(50) | 18/22 | — | — | 80 |
| 13+ | 1-butene VLDPE* | PVDC blend+++ | LLDPE | 30-48 | ++++ | 2.5 (.098) | 120+/1.90 /(48) | 17/20 | 100/85 (39/33) | 65/70 (26/28) | — |
| 14+ | 1-hexene VLDPE** | PVDC blend+++ ++ | LLDPE | 36-47 | ++++ | 2.1 (.083) | 120+/2.37 /(60) | 16/18 | 120/90 (47/35) | 75/70 (30/28) | — |
| 15+ | 1-octene VLDPE*** | PVDC blend+++ | LLDPE | 31-50 | ++++ | 1.9 (.075) | 120+/1.90 /(48) | 14/17 | 70/95 (28/37) | 60/70 (24/28) | — |
| 16+ | C2C4C6 VLDPE**** | PVDC blend+++ | LLDPE | 32-50 | ++++ | 2.6 (.10) | 120+/2.16 /(55) | 14/21 | 115/110 (45/43) | 76/85 (30/33) | — |

RT - Room Temperature
*An experimental VLDPE copolymer of ethylene and 1-butene provided by Union Carbide Corp. of Danbury, Connecticut.
**An experimental VLDPE copolymer of ethylene and 1-hexene provided by Union Carbide Corp. of Danbury, Connecticut.
***A commercially available VLDPE copolymer of ethylene and 1-octene sold by The Dow Chemical Company under the brand name Attane 4001.
****An experimental ethylene, 1-butene, 1-hexene very low density polyethylene terpolymer provided by Union Carbide Corporation of Danbury, Connecticut.
+These films were irradiated at a dosage of 3.5 Mrad.
++Each inner layer component was blended with 25% by weight of an ethylene-vinyl acetate copolymer (EVA).
+++A 3:1 blend of a commercially available vinylidene chloride-methylacrylate copolymer and vinylidene chloride-vinyl chloride copolymer.
++++Not determined. However, the average gauge is expected to be similar to the values for the similar but unirradiated films of examples 9-12 since samples of the films made for examples 9-12 were irradiated to arrive at examples 13-16.

Further modifications of the invention disclosed will be apparent to those skilled in the art and all such modifications are deemed to be within the scope of the invention as defined by the following claims.

What is claimed is:

1. A biaxially stretched, heat shrinkable multilayer film comprising at least one layer comprising a terpolymer of monomers (a), (b) and (c) wherein monomer (a) comprises ethylene, monomer (b) comprises a $C_6$–$C_8$ alpha-olefin, and monomer (c) comprises 1-butene or 1-hexene wherein said terpolymer has a density less than 0.915 g/cm$^3$, and at least one additional polymeric film layer.

2. A biaxially stretched, heat shrinkable film comprising a terpolymer of monomers (a), (b) and (c) wherein monomer (a) comprises ethylene, monomer (b) comprises a $C_6$–$C_8$ alpha-olefin, and monomer (c) comprises 1-butene or 1-hexene, wherein said terpolymer has a density less than 0.915 g/cm$^3$ and wherein said film is irradiated.

3. A film, as defined in claim 1, wherein said at least one additional film layer is coextruded.

4. A film, as defined in claim 1, wherein said additional layer is laminated.

5. A film, as defined in claim 1, wherein said additional layer is extrusion coated.

6. A multilayer, heat shrinkable, biaxially stretched film comprising a first layer of a terpolymer of monomers (a), (b) and (c) wherein monomer (a) comprises ethylene, monomer (b) comprises a $C_6$–$C_8$ alpha-olefin, and monomer (c) comprises 1-butene and 1-hexene, and said terpolymer having a density less than 0.915 g/cm$^3$; a second polymeric layer; and a third layer having oxygen barrier properties provided by a polymer selected from the group consisting of vinylidene chloride-vinyl chloride copolymer, vinylidene chloride-methylacrylate copolymer, blends thereof, ethylene-vinyl alcohol copolymer, nylon and acrylonitrile.

7. A multilayer film, as defined in claim 6, wherein said third layer having oxygen barrier properties is an intermediate layer.

8. A multilayer film, as defined in claim 6, wherein said monomer (c) comprises 1-butene.

9. A multilayer film, as defined in claim 6, wherein said monomer (c) comprises 1-hexene.

10. A multilayer film, as defined in claim 7, wherein said $C_6$–$C_8$ alpha-olefin comprises 1-hexene.

11. A multilayer film, as defined in claim 6, wherein said $C_6$–$C_8$ alpha-olefin comprises 4-methyl-1-pentene.

12. A multilayer film, as defined in claim 6, wherein said $C_6$–$C_8$ alpha-olefin comprises 1-octene.

13. A multilayer film, as defined in claim 6, wherein said third layer comprises a blend of vinylidene chloride methylacrylate copolymer and vinylidene chloride-vinyl chloride copolymer.

14. A multilayer film as defined in claim 6, wherein said third layer comprises vinylidene chloride-vinyl chloride copolymer.

15. A multilayer film, as defined in claim 6, wherein said second polymeric layer comprises linear low density polyethylene, very low density polyethylene, low density polyethylene, high density polyethylene, ionomer, ethylene-vinyl acetate copolymer, nylon or mixtures thereof.

16. A multilayer film, as defined in claim 6, wherein said second polymeric layer is an outer layer of said film.

17. A multilayer film, as defined in claim 6, wherein said third oxygen barrier layer comprises vinylidene chloride-methylacylate copolymer.

18. A multilayer film, as defined in claim 6, wherein said third oxygen barrier layer comprises an ethylene-vinyl alcohol copolymer.

19. A multilayer film, as defined in claim 10, wherein said third layer comprises a blend of vinylidene chloride methylacrylate copolymer and vinylidene chloride-vinyl chloride copolymer.

20. A multilayer film, as defined in claim 10, wherein said second layer is an outer layer comprising very low density polyethylene or linear low density polyethylene.

21. A multilayer film, as defined in claim 6, wherein at least one layer of said film is irradiated.

22. A multilayer film, as defined in claim 10, wherein all layers are irradiated.

23. A multilayer film, as defined in claim 6, wherein said film is coextruded or extrusion coated.

24. A multilayer film, as defined in claim 6, wherein said polymer has crystalline melting point greater than about 110° C.

25. A multilayer film, as defined in claim 6, wherein said terpolymer has a crystalline melting point between about 115° C. and 125° C.

26. A multilayer film, as defined in claim 6, wherein said terpolymer has a Vicat softening point of at least 60° C.

* * * * *